Nov. 6, 1956  J. P. JONES  2,769,298
TREE SHAKERS
Filed May 11, 1955  2 Sheets-Sheet 1
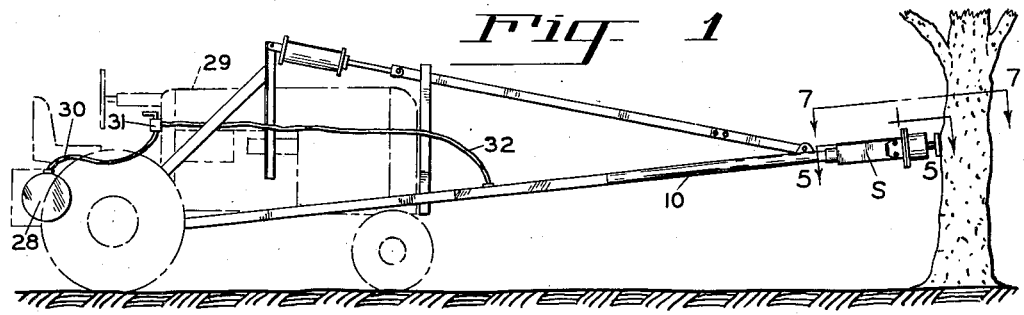
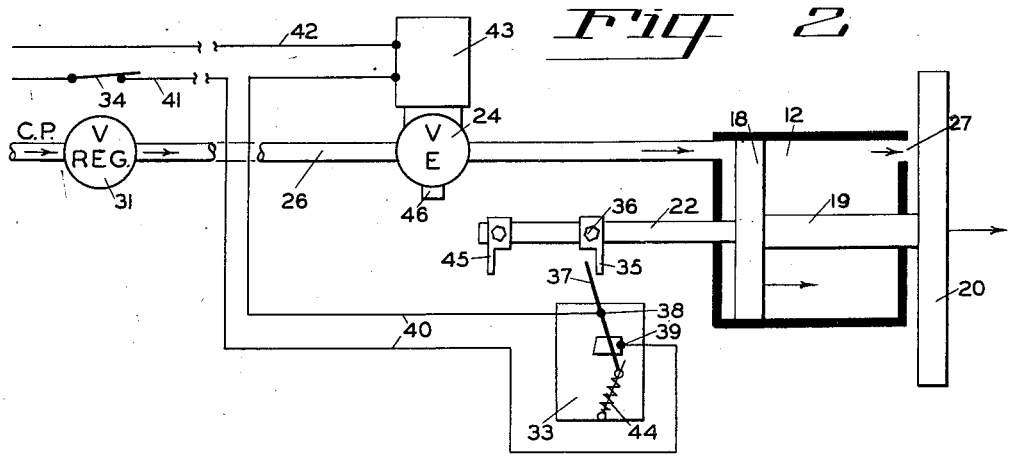
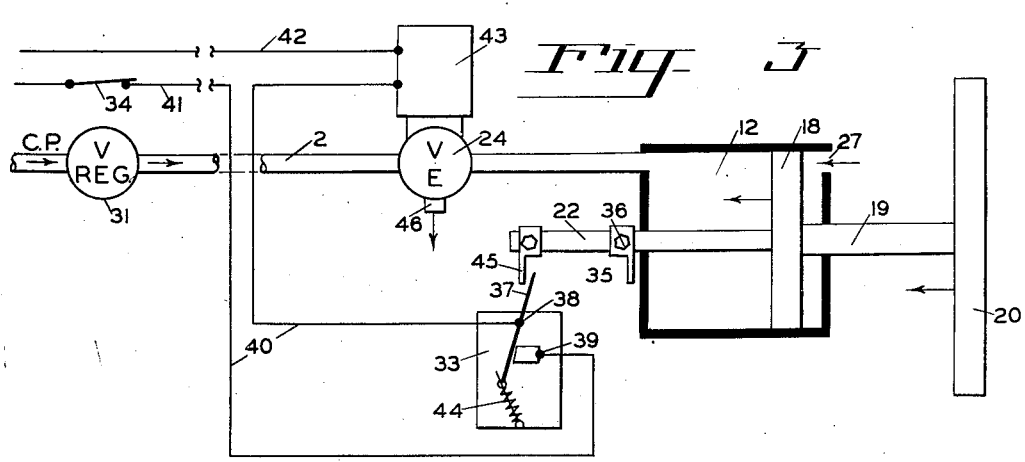
INVENTOR.
JOHN P. JONES
BY
ATTORNEY Nov. 6, 1956 J. P. JONES 2,769,298
TREE SHAKERS
Filed May 11, 1955 2 Sheets-Sheet 2
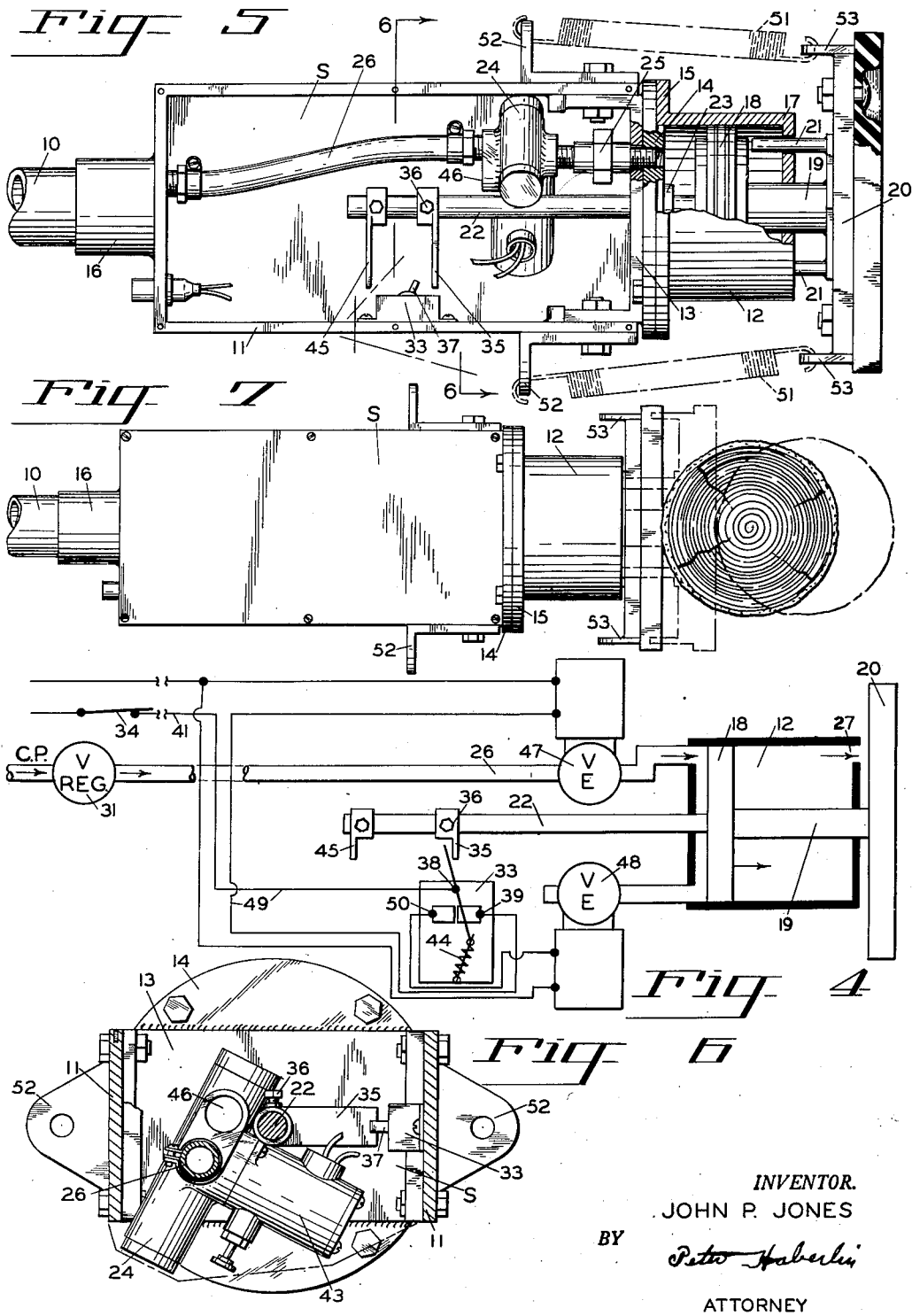
INVENTOR.
JOHN P. JONES
BY Peter Haberlin
ATTORNEY

United States Patent Office 2,769,298
Patented Nov. 6, 1956

2,769,298

TREE SHAKERS

John P. Jones, Portland, Oreg.

Application May 11, 1955, Serial No. 507,657

3 Claims. (Cl. 56—328)

This invention relates to tree shakers or vibrators, but more particularly to a structure of this kind that is adapted to vibrate fruit bearing trees in order to loosen nuts and softer fruits from the foliage and branches of such trees.

This application may be considered as a further amplification and development of the tree shaker described in a prior application filed September 17, 1951, identified by Serial Number 246,943, and now Patent 2,729,199 and while the end result is the same as that described in the prior application, the means of operation and vibrating are controlled by magnetically operated valves, which are actuated by an air operated piston. In the copending application, a strictly mechanically operated valve is used for applying the air to the piston, which is not as well adapted to the operation of the herein described embodiment as is the magnetically operated valve.

It has been found that a single magnetically controlled valve can be used in the operation of the piston by letting air enter the cylinder to reciprocate the piston, and also to exhaust said air at the end of the piston stroke. It has also been found that two of these magnetic valves could be effectively used; one admitting air into the cylinder, while the other serves as an exhaust valve. These valves form no part of this application, since they are standard valves which can be bought in the open market.

One object of the herein disclosed embodiment of this invention is to provide a tree shaker that is operated by a piston which is supported in, and reciprocably operative from a cylinder, and further:

To provide electrically operated valves which are controlled by manually actuated switches that open and close the circuits to cause the intake and exhaust of air relative to the cylinder, and again:

To provide a tree shaker that is adapted to be affixed to a hollow boom attached to and outwardly extending from the front portion of a tractor for purposes to be hereinafter more fully set forth.

Other objects and advantages of the herein described embodiment of this invention will become apparent in the following specification and particularly defined in the appended claims, which taken in connection with the accompanying drawings form part of this application, in which:

Figure 1 is a side elevation of this new and improved tree shaker mounted to a conventional tractor and bearing against a tree to be shaken.

Figure 2 is a diagram layout of the shaker, illustrating the piston in retracted position, and one magnetic valve.

Figure 3 is the same as Figure 2, except that the piston is in extended position.

Figure 4 is a diagram layout wherein two magnetic valves are used: one for supplying air to the cylinder and one for exhausting the air, with the piston in retracted position.

Figure 5 is an enlarged plan view of the power head, taken on line 5—5 of Figure 1, parts broken away for convenience of illustration.

Figure 6 is an end sectional view, taken on line 6—6 of Figure 5, looking in the direction indicated by arrows.

Figure 7 is a plan view showing the shaker in contact with a tree; the piston being is retracted position as indicated by full lines; the broken lines showing the movement of the tree when the piston is extended.

Now with more detailed reference to the drawings, the shaker in its entirety is indicated by the letter S, and is mounted on the outer end of boom 10, which is of hollow construction to provide a reservoir for the supply of air, while a rectangular frame 11, forming part of said shaker is attached to the boom in a manner to be hereinafter described.

A cylinder 12 is connected to frame 11 by flat-bar 13, the web portion of which is welded, or otherwise secured to cylinder head 14, while the wing members of said flat-bar are bolted through the frame adjacent to the free ends of frame 11.

The cylinder head 14 is bolted to flange 15 of cylinder 12, as clearly shown in Figures 5 and 6, while the closed end of frame 11 is secured to boom 10 by means of socket 16, which is integral with the closed end of frame 11.

Cylinder 12 has an integral head 17 opposite its removable head 14. Cylinder 12 has reciprocably operable therein a piston 18, which has a piston rod 19 integral therewith which passes through head 17 and is affixed to cross head 20, without the cylinder. This piston is kept from rotating by the guide members 21, which are fixedly mounted to the cross head and pass inwardly through the cylinder head 17.

Extending through the cylinder head 14 is an electric switch operating rod 22, which enters through stuffing box 23 for purposes to be hereinafter described in detail.

Connected to the cylinder head 14 is a magnetic valve 24, designed to connect to cylinder head 14 by coupling 25, while air is supplied to said valve through hose connection 26, which delivers air from the hollow boom 10 into the cylinder 12 when magnetically operated.

A bleeder port 27 is located in the piston head 17 and is adapted to allow free movement of air into and out of the cylinder 12, while an air supply tank 28, mounted on the tractor 29 delivers air through hose line 30 and reducing valve 31, then into the boom 10 through hose 32. By delivering air into the boom it brings the supply of air relatively close to the valve 24 so that the air will move with the least amount of resistance into this valve. A pumping means, not here shown, maintains air pressure within the tank 28.

The magnetic valve 24 is operated from the switch 33, referring to Figures 2 and 3. A master hand-operated switch 34 is located near the control panel of the tractor and is opened and closed by the operator.

When the tractor is brought forward toward a tree to be shaken, the cross head 20 will engage the tree as illustrated in Figures 1 and 7, or it may engage one of the limbs of the tree depending on the desire of the operator. This forces the piston 18 to the position shown in Figures 1, 2, 5 and 7; then finger 35, which is adjustably attached to rod 22 by set screw 36, contacts the switch bar 37 of the switch 33, which closes an electric circuit between contacts 38 and 39 by way of the conductors 40, and into the conductor 41, but in the event that switch 34 is closed, the electric energy will flow through the conductor 42 into the solenoid 43 of the magnetic valve 24 and through the conductor 40, through the switch 33 and back to the main line by way of the switch 34. This will open the valve 24 and allow air to flow from the hollow boom 10 from the reducing valve 31 at the supply tank 28 into the cylinder 12 and against the piston 18. This will force the piston in the direction of the arrows, together with the piston rod 19 and the cross head 20, forcing the tree to the broken line position as shown in Figure 7.

When the finger 35 leaves the switch bar 37, the over-center spring 44 will hold the switch closed until the operating finger 45, which is also carried by the operating rod 22, contacts the switch bar 37, breaking the same from the electric contacts 38 and 39. This will cause the spring 44 to snap the switch bar to the position shown in Figure 3, operating the contacts 38 and 39, demagnetizing the solenoid 43 of the valve 24, shutting off the air supply to the cylinder 12 and exhaust the previous air admitted into the cylinder back through the valve and out through the exhaust port 46. The pressure of the distorted tree or limb will return the cross head 20 to the position shown in Figure 2, again closing the switch 33, as above described. This operation will continue as long as the tractor 29 forces the cross head 20 through the boom 10, against the tree or limb, or as long as the mechanical control switch 34 is maintained closed by the operator.

By the use of the switch 34, the operator can shut off the reciprocation of the piston 18 within the cylinder 12 at will. This being accomplished, he can apply the shaking operation to the tree or limb in such a manner as to most effectively shake the fruit therefrom without backing the tractor away from the tree. By controlling the reducing valve 31, the power exerted by the piston 18 can be increased and its speed can also be varied by the proper manipulation of the pressure valve, and the length of the stroke of the piston 18 can be varied by adjusting the fingers 35 and 45 along the operating rod 22.

Referring to Figure 4, an alternate form of air control is illustrated. Two magnetic valves 47 and 48 are used. One valve is to admit air into the cylinder 12 and one is to exhaust the air. The switch 33 has two sets of contacts, one set of contacts 38 and 39 control the operation of one valve 47 through the conductors 49, while the contacts 50 and 38 control the electric circuit to the other magnetic valve 48 by way of conductor 41. Except for this modification the herein illustrated and described structure is unchanged.

In the event that the shaker is being applied to a relatively slender tree, the operation of the piston may be facilitated by adding additional auxiliary means for returning the piston to its starting position. This is accomplished by auxiliary springs 51, as shown in Figure 5. These springs are illustrated by broken lines.

One end of the spring is anchored to the frame 11 by means of the brackets 52, while their opposite ends are connected to the cross head 20 by ears 53.

While this invention has been described in detail and with specific illustrations, it is understood that other modifications in construction and arrangements of parts may be devised without departing from the spirit and scope of the invention. The present embodiment is illustrative but not restrictive, since the scope and purview of the invention is indicated by the appended claims rather than by the foregoing description.

Having thus fully illustrated and described an embodiment of the invention and a method of producing the same, in a manner that may enable others skilled in the art to which it appertains to construct and use the same, what is claimed and desired to be secured by Letters Patent, is:

1. The combination with a tractor, of an air operated, electrically controlled tree shaking structure, attached to and extending forwardly of said tractor, comprising a frame, a socket attached to one end of said frame, a hollow boom connecting said socket and frame with the tractor for the purpose of supporting the frame, a cylinder having one integral head and one detachable head extending forwardly from said frame, means to affix said cylinder to the frame, a reciprocable piston operable in said cylinder, a piston rod integral with said piston, a cross head attached to said piston rod without the cylinder, a magnetic valve mounted within the frame and coupled to the detachable cylinder head, an air supply tank mounted on the tractor, hose connections leading from said tank to the hollow boom, another hose passing through the frame to deliver air from the hollow boom to the magnetic valve.

2. A structure as defined in claim 1, having a switch to control the opening and closing of said magnetic air valve by means of fingers attached to the switch operating rod which is reciprocated by the piston.

3. A structure as defined in claim 1, having guides attached to the cross head and passing through the integral cylinder head for the purpose of preventing rotation of said piston.

References Cited in the file of this patent

UNITED STATES PATENTS

| 1,626,068 | Bartlett | Apr. 26, 1927 |
| 1,998,873 | Kingsbury | Apr. 23, 1935 |
| 2,690,639 | Goodwin | Oct. 5, 1954 |
| 2,692,470 | Boman | Oct. 26, 1954 |